Nov. 18, 1958   L. M. TRAINO ET AL   2,860,560
FOCUSING MECHANISM FOR PHOTOGRAPHIC CAMERA
Filed July 29, 1953   2 Sheets-Sheet 1

INVENTOR.
LOUIS M. TRAINO
AND LEIF ARNESEN
BY
ATTORNEY

Nov. 18, 1958  L. M. TRAINO ET AL  2,860,560
FOCUSING MECHANISM FOR PHOTOGRAPHIC CAMERA
Filed July 29, 1953  2 Sheets-Sheet 2

INVENTOR.
LOUIS M. TRAINO
AND LEIF ARNESEN
BY
ATTORNEY

United States Patent Office 2,860,560
Patented Nov. 18, 1958

2,860,560

FOCUSING MECHANISM FOR PHOTOGRAPHIC CAMERA

Louis M. Traino and Leif Arnesen, Rochester, N. Y., assignors to Graflex, Inc., Rochester, N. Y., a corporation of Delaware Application July 29, 1953, Serial No. 371,053

10 Claims. (Cl. 95—45)

The present invention relates to photographic cameras and more particularly to focusing mechanisms of such cameras. In a more specific aspect, the invention relates to focusing mechanism for cameras of the so-called "candid" type for taking small size pictures suitable for making color slides and for enlargements.

One of the uses of the so-called "candid" cameras is in taking snapshots of a person or of a scene. These cameras should have, therefore, a fast focusing mechanism.

Heretofore in these cameras the objective lens has been mounted in a tube or barrel which protrudes forwardly from the camera and which is adjustable axially for focusing by rotation of a rotatable, graduated focusing ring or dial that has threaded engagement with the barrel, or that is connected with the tube or barrel by a pin that travels in a helical slot in the barrel.

In attempting to focus cameras of the type described as heretofore constructed, the photographer has to manipulate the focusing ring with one hand while attempting to hold and steady the camera with his other hand. Moreover, if the camera has no coupled rangefinder, the photographer has to lock at the focusing ring in adjusting to a particular distance setting; and this slows up the picture taking process as well as subjecting it to error.

One object of the present invention is to provide means for enabling faster focusing of a camera, and particularly of a camera of the type described.

Another object of the invention is to provide means for more easily focusing such a camera.

Another object of the invention is to provide a camera having means which will permit a photographer to focus the camera while grasping the camera firmly with both hands.

Other objects of the invention will be apparent hereinafter from the specification and from the recital of the appended claims.

Figure 1:
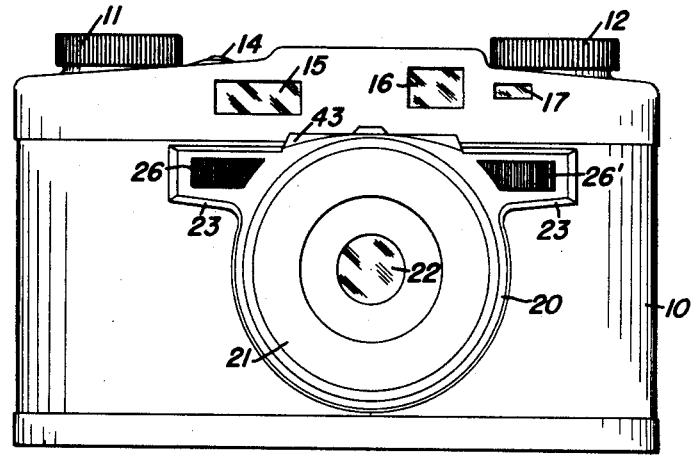
Fig. 1 is a front elevation of a camera constructed according to one embodiment of this invention.

Referring now to the drawings by numerals of reference, 10 indicates the camera casing which houses the film supply and takeup spools, and which may house a suitable rangefinder. Conventional knurled knobs 11 and 12 are provided on the camera for rotating the spools to advance and rewind the film. A socket 13 is also provided on top of the camera casing for reception of a flashlight case; and an exposure counter may also be provided, as denoted at 14. Windows 15 and 17 are provided in the front of the camera through which the two different images of the subject are produced in the rangefinder system. 16 is a window in the front of the camera through which the subject may be viewed when a picture is being taken.

The focusing mechanism of the camera is supported in a body or housing 20 which has a generally rectangular-shaped portion 18 that is secured in the casing 10 and that has an aperture 19 therein through which access may be had to the focusing mechanism. The aperture 19 is concealed by the casing and by a cover plate, to which reference will be made hereinafter, when the body or housing is mounted in the casing. The body or housing protrudes forwardly from the casing; and slidably mounted in the body or housing 20 is a barrel or tube 21 which carries the objective lens 22 of the camera and the camera shutter.

The body portion 20 forward of casing 10 is round about the major portion of its periphery, but is formed at opposite sides at its top with wing portions 23. The body or housing 20 is secured in casing 10 by screws (not shown) which thread into holes 24 in the body or housing.

Figure 5:
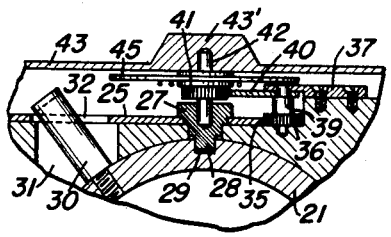
Fig. 5 is a fragmentary section taken on the line 5—5 of Fig. 3, looking in the direction of the arrows.
Figure 6:
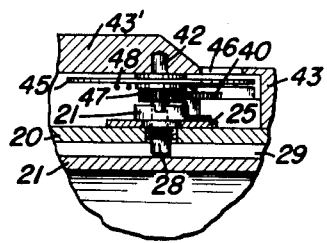
Fig. 6 is a fragmentary section taken on the line 6—6 of Fig. 3, looking in the direction of the arrows.

The means for focusing the camera comprises a double-armed lever 25. This lever is in the form of an irregularly shaped plate that has enlarged portions 26, 26' at opposite ends which have knurled front faces. The lever is pivotally mounted intermediate its ends upon a pivot pin 27 (Figs. 5 and 6) that threads into the body or housing 20, and that has a protruding portion 28 which engages in a slot or groove 29 that extends axially of the tube 21.

Threaded into the tube 21 at one side of the pin 27 is a driving pin 30. This pin extends through a slot 31 in the body 20 and engages in an elongate slot 32 in the lever 25. The enlarged, knurled end portions 26, 26' of lever 25 constitute finger rests on which the photographer puts a finger of each hand as he grasps the camera casing at both sides with his hands and sights the camera on the subject to be photographed. When one end 26 or the other 26' of the lever 25 is pressed, the lever will move, in one direction or the other about its pivot pin 27, thereby actuating the driving pin 30 and imparting axial movement to the tube 21 in one direction or the other depending upon whether the photographer applies pressure to end 26 or to end 26' of the lever. Protrusion 28 of pin 27 holds the tube 21 against rotation and constrains it to travel axially.

Figure 2:
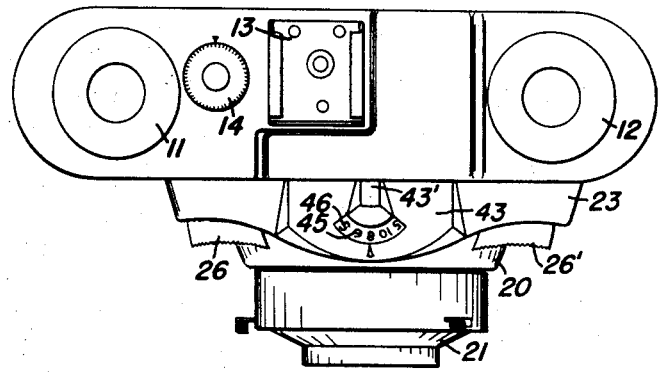
Fig. 2 is a plan view of this camera.
Figure 3:
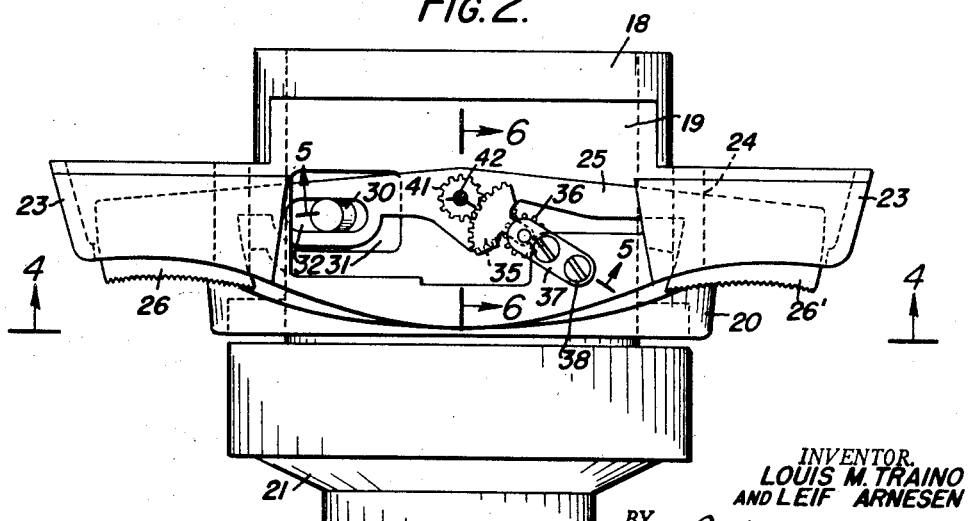
Fig. 3 is a fragmentary plan view, with parts broken away, showing the focusing mechanism of the present invention on an enlarged scale.
Figure 7:
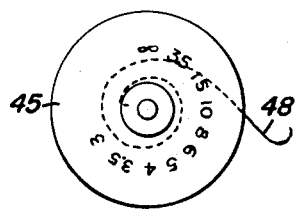
Fig. 7 is a plan view of the distance indicating dial of the focusing mechanism.

The lever 25 has formed integral therewith a toothed segment 35 (Fig. 3) which meshes with a spur pinion 36 (Figs. 3 and 5) that is journaled in the body 20 at its lower end and that is journaled at its upper end in a plate 37 which is secured to the body 20 by screws 38. Fixed to the shaft 39, to which the pinion 36 is secured, is a spur segment 40 which meshes with a spur pinion 41. This pinion is secured to a shaft 42 that is journaled at its lower end in the pin 27 and at its upper end in a cover 43 which is fastened by screws (not shown) to the body 20 to enclose the space within which the lever 25 is mounted. Fastened to the shaft 42 is an indicator dial 45 which is graduated to designate different focal distances from say three feet to infinity, as shown in Fig. 7. The graduations of the indicator dial may be read against an arrow on cover 43 as shown in Fig. 2. The cover 43 is provided with an aperture or window 46 (Fig. 6) therein through which the indicator dial 45 can be viewed. The cover 43 has an upwardly protruding portion 43' in which the upper end of the shaft 42 is journaled. This portion slopes downwardly to the window opening 46, as clearly shown in Fig. 6. A coil spring 48 (Fig. 7) may be fastened at one end to the dial 45 or shaft 42 and at its opposite end to a pin (not shown) secured in the body 20 to constantly urge the gears of the setting mechanism in one direction to take up backlash.

In use, the photographer grasps the camera at its sides with both hands. While thus securely holding the camera, the photographer rests a finger of each hand on the two knurled finger rest portions 26, 26' of the lever 25. By sighting the camera through its viewfinding and rangefinder eyepieces (not shown) at the rear of the camera, which are aligned with windows 17 and 16 (Fig. 1), and simultaneously pressing on one end or the other 26, 26' of the lever 25 the photographer, then, can focus the camera quickly and accurately on the subject. He does not have to take either hand off the camera to actuate the focusing mechanism. The camera is rigidly and securely held all the while.

As the lever 25 rocks in one direction or the other about its pivot, it forces the driving pin 30 rearwardly or forwardly depending upon whether the finger rest 26 or the finger rest 26', respectively, is pressed. Driving pin 30 moves the objective lens barrel 21 rearwardly or forwardly accordingly. At the same time, segment 35 on lever 25 drives the indicator dial 45 through the gearing 36, 40 and 41. The photographer can thus set the objective lens to a desired focal distance. The rangefinder of the camera may be coupled to the lens barrel 21 through any suitable or conventional coupling mechanism.

It will be seen, therefore, that the camera can be focused quickly and easily and at the same time very precisely.

Figure 4:
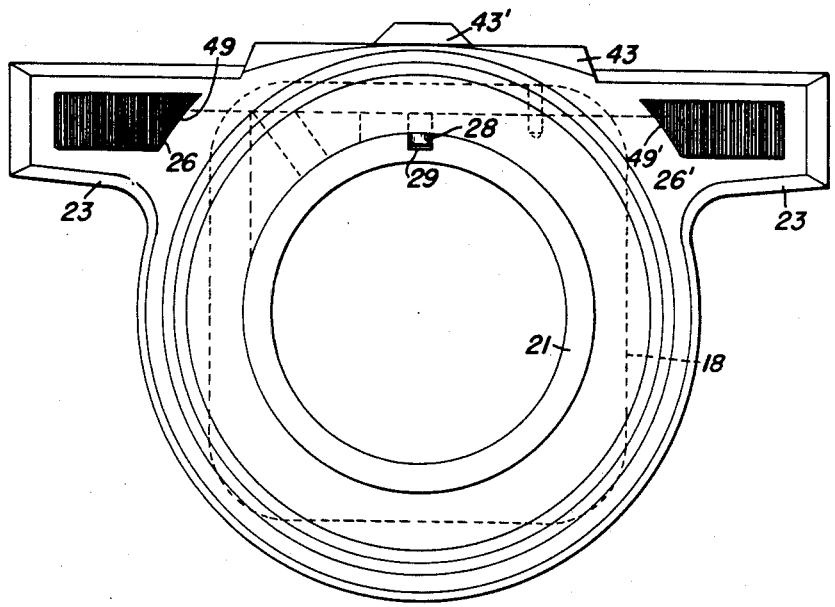
Fig. 4 is a section on the line 4—4 of Fig. 3 looking in the direction of the arrows.

In the embodiment of the invention shown in the drawings the finger rests 26, 26' have arcuately curved inside edges as denoted at 49, 49' (Fig. 4). This is only for appearance, however; and the finger rests may be of any suitable shape. The finger rests may be, as shown, portions of greater thickness than the main portion of the lever, or they may be formed by bending the lever at its ends at right angles to its main portion to form such finger rests.

While the invention has been described in connection with a particular embodiment thereof, then, it will be understood that it is capable of further modification; and this application is intended to cover any variations, uses, or adaptations of the invention following, in general, the principles of the invention including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A photographic camera comprising a casing, a tube reciprocably mounted in said casing and constituting an objective lens mount, said tube being axially adjustable forwardly and rearwardly in said casing for focusing, and means for effecting said adjustment comprising a double-armed lever pivotally mounted in said casing for movement about an axis radial of the axis of said tube and intermediate the ends of said lever, said lever having its opposite ends extending outside said casing adjacent to opposite sides, respectively, of said casing and having finger rests at its opposite ends whereby it may be manually moved in opposite directions about its pivot by a photographer holding said casing at opposite sides, and means connecting said lever to said tube to move said tube axially in opposite directions, respectively, upon pressure on the opposite finger rests, respectively.

2. A photographic camera comprising a casing, a tube axially slidable in said casing and constituting an objective lens mount, said tube being axially adjustable in said casing for focusing, a double-armed lever pivotally mounted in said casing for movement about an axis radial of the axis of said tube and intermediate the ends of said lever, said lever having its opposite ends extending outside said casing adjacent to opposite sides, respectively, of said casing and having finger rests at its opposite ends whereby it may be manually moved in opposite directions about its pivot by a photographer holding said casing at opposite sides and pressing on said finger rests, and means including a pin offset from the pivotal axis of said lever for connecting said lever to said tube to move said tube axially in opposite directions, respectively, upon pressure on the opposite finger rests, respectively.

3. A photographic camera comprising a casing, a tube axially slidable in said casing and constituting an objective lens mount, said tube being axially adjustable in said casing for focusing, a double-armed lever pivotally mounted in said casing for movement about an axis radial of the axis of said tube and intermediate the ends of said lever, said lever having its opposite ends projecting outside said casing and extending adjacent to opposite sides, respectively, of said casing, and having finger rests at its opposite ends whereby it may be manually moved in opposite directions about its pivot by a photographer holding said casing at opposite sides and pressing on said finger rests, and a pin secured to said tube radial of the axis of said tube and engaging in a slot in said lever at one side of the pivotal axis of said lever, whereby said tube is moved in opposite directions, respectively, upon pressing on the opposite finger rests, respectively.

4. A photographic camera comprising a casing, a tube axially slidable in said casing and constituting an objective lens mount, said tube being axially adjustable in said casing for focusing, a pivot pin secured in said casing radial of the axis of said tube and engaging in a longitudinal slot in said tube to prevent rotary movement of said tube and to guide said tube in its axial adjustment, a double-armed lever pivotally mounted intermediate its ends on said pivot pin for movement about an axis radial of the axis of said tube, said lever having its opposite ends projecting outside said casing and extending adjacent to opposite sides, respectively, of said casing, and having finger rests at its opposite ends whereby it may be moved manually in opposite directions by a photographer holding said casing at opposite sides thereof and pressing on said finger rests, and means connecting said lever to said tube to move said tube axially in opposite directions, respectively, upon application of pressure to opposite ends of said lever.

5. A photographic camera comprising a casing, a tube axially slidable in said casing and constituting an objective lens mount, said tube being axially adjustable forward and back in said casing for focusing, a pivot pin secured in said casing radial of the axis of said tube and engaging in a longitudinal slot in said tube to prevent rotary movement of said tube and to guide said tube in its axial adjustment, a double-armed lever pivotally mounted intermediate its ends on said pivot pin for movement about an axis radial of the axis of said tube, said lever having its opposite ends extending outside said casing adjacent to opposite sides, respectively, of said casing, whereby opposite ends of said lever may be manipulated by a person holding said casing in his hands, means connecting said lever to said tube to move said tube axially in opposite directions, respectively, upon application of pressure to opposite ends of said lever, an indicator dial mounted in said casing coaxial with said lever, and means connecting said lever with said dial to rotate said dial on movement of said lever to indicate the focal distance adjustment of the tube.

6. A photographic camera comprising a casing, a tube axially slidable in said casing and constituting an objective lens mount, said tube being axially adjustable forward and back in said casing for focusing, a pivot pin secured in said casing radial of the axis of said tube and engaging in a longitudinal slot in said tube to prevent rotary movement of said tube and to guide said tube in its axial adjustment, a double-armed lever positioned above said tube and pivotally mounted intermediate its ends on said pivot pin for movement about an axis radial of the axis of said tube, said lever having its opposite ends projecting outside said casing at the front thereof and adjacent to opposite sides, respectively, of said casing, whereby opposite ends of said lever may be manipulated by a person holding said casing in his hands, and means including a pin offset from the pivotal axis of said lever for connecting said lever to said tube to move said tube axially in opposite directions, respectively, upon application of pressure to opposite ends of said lever.

7. A photographic camera comprising a casing, a tube axially slidable in said casing and constituting an objective lens mount, said tube being axially adjustable in said casing for focusing, a pivot pin secured in said casing radial of the axis of said tube and engaging in a longitudinal slot in said tube to prevent rotary movement of said tube and to guide said tube in its axial adjustment, a double-armed lever pivotally mounted intermediate its ends on said pivot pin for movement about an axis radial of the axis of said tube, said lever having its opposite ends extending outside said casing adjacent to opposite sides, respectively, of said casing and having finger rests at opposite ends whereby it may be manually rocked in opposite directions about its pivot by a person grasping said casing at opposite sides thereof, a pin secured to said tube and engaging in a slot in said lever at one side of the pivotal axis of said lever for connecting said lever to said tube to move said tube axially in opposite directions, respectively, upon pressure on the opposite finger rests, respectively, an indicator dial mounted in said casing coaxial with said lever, and gearing connecting said lever with said dial to rotate said dial on movement of said lever to indicate the focal distance adjustment of said tube.

8. A photographic camera comprising a casing, a tube axially slidable in said casing and constituting an objective lens mount, said tube being axially adjustable forwardly and rearwardly in said casing for focusing, a pivot pin secured in said casing radial of the axis of said tube and engaging in a longitudinal slot in said tube to prevent rotary movement of said tube and to guide said tube in its axial adjustment, a double-armed lever pivotally mounted intermediate its ends on said pivot pin for movement about an axis radial of the axis of said tube, said lever having finger rests at opposite ends whereby it may be manually rocked in opposite directions about its pivot, a pin secured to said tube and engaging in a slot in said lever at one side of the pivotal axis of said lever for connecting said lever to said tube to move said tube axially in opposite directions, respectively, upon pressure on the opposite finger rests, respectively, an indicator dial mounted in said casing coaxial with said lever, gearing connecting said lever with said dial to rotate said dial on movement of said lever to indicate the focal distance adjustment of said tube, and a housing secured to said casing at the front thereof for enclosing said lever, pins, and indicator dial, said housing having a pair of openings therein at the front thereof through which said finger rests protrude adjacent to opposite sides of said casing for manipulation of said lever by a person holding said camera by grasping said camera in his two hands at opposite sides of said casing, and said housing having an aperture therein at the top thereof through which said dial may be viewed.

9. A photographic camera comprising a casing, a tube reciprocable axially in said casing and constituting an objective lens mount, said tube being axially adjustable in said casing for focusing, a double-armed lever mounted in said casing above said tube for pivotal movement about an axis radial of the axis of said tube, said lever having finger rests at its opposite ends whereby it may be manually rocked in opposite directions about its pivot, said finger rests being disposed adjacent opposite sides, respectively, of said casing in position to be pressed by a photographer while grasping the camera at its opposite sides with both hands, means connecting said lever to said tube to impart axial movement to said tube in opposite directions, respectively, when the opposite finger rests are pressed, a graduated indicator dial rotatably mounted in said casing above said lever in position to be observed by the photographer, and means connecting said lever to said dial to rotate said dial on movement of said lever to indicate the focal distance adjustment of said tube.

10. A photographic camera comprising a casing, a tube reciprocably mounted in said casing and constituting an objective lens mount, said tube being axially adjustable forwardly and rearwardly in said casing for focusing, and means for effecting said adjustment comprising a double-armed lever positioned in said casing above said tube for pivotal movement about an axis intermediate the ends of said lever and intersecting the axis of said tube, and means connecting said lever to said tube to move said tube axially in opposite directions, respectively, upon application of pressure to opposite ends, respectively, of said lever, said lever having its opposite ends projecting outside said casing at the front thereof and adjacent to opposite sides, respectively, of the casing so that they may be pressed by a photographer with his fingers while grasping said casing at opposite sides thereof.

References Cited in the file of this patent

UNITED STATES PATENTS

| | | |
|---|---|---|
| 1,227,675 | Ruttan et al. | May 29, 1917 |
| 1,856,432 | Rudolph | May 3, 1932 |
| 2,265,896 | Dalotel | Dec. 9, 1941 |
| 2,353,227 | Drotning | July 11, 1944 |

FOREIGN PATENTS

| | | |
|---|---|---|
| 23,388 | Great Britain | 1914 |
| 122,151 | Great Britain | Jan. 9, 1919 |
| 537,815 | Germany | Oct. 22, 1931 |
| 627,187 | Germany | Mar. 18, 1936 |
| 199,203 | Switzerland | Oct. 17, 1938 |